Patented May 17, 1949

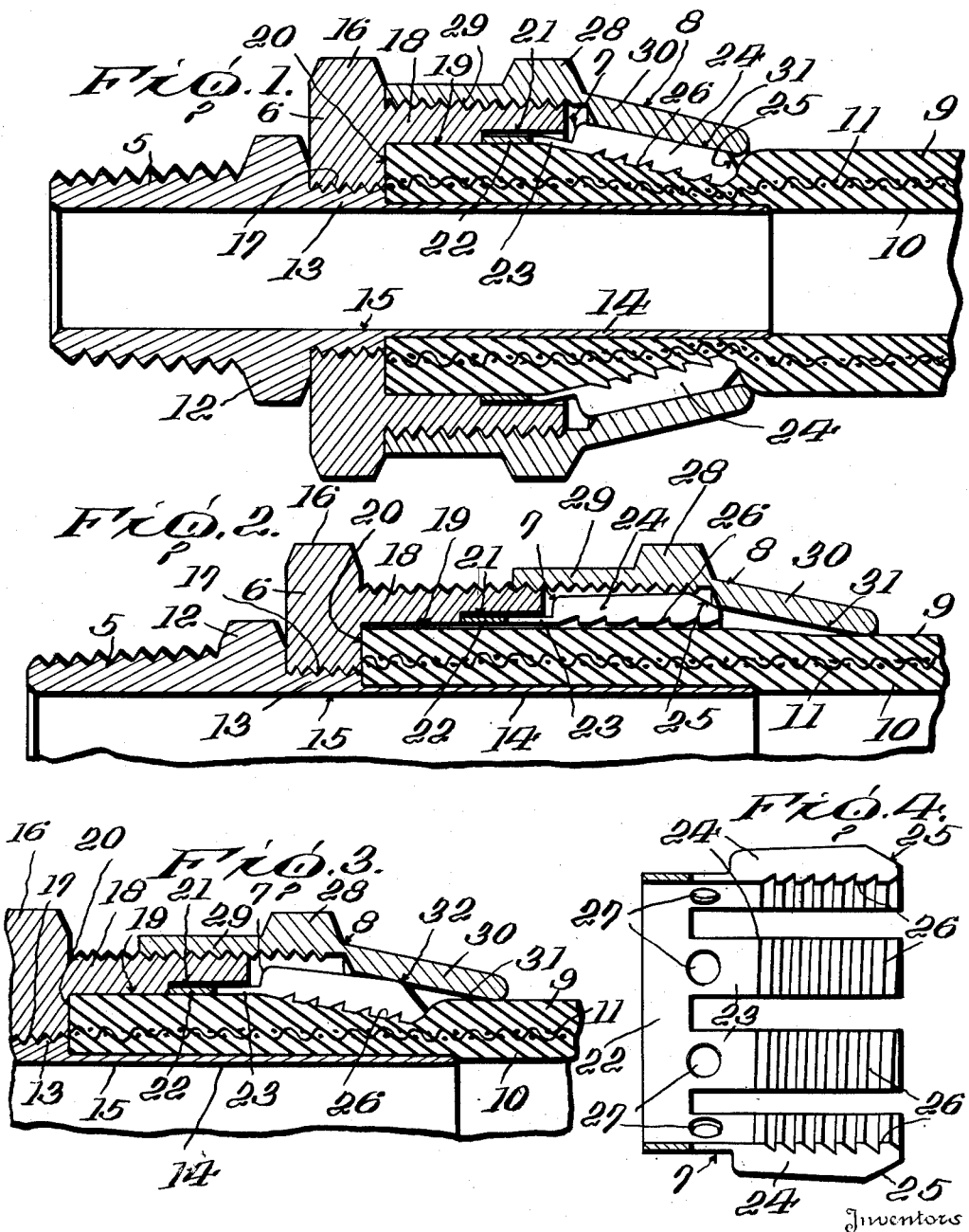

2,470,538

UNITED STATES PATENT OFFICE 2,470,538

FOUR-PIECE HOSE COUPLING

John N. Wolfram and Shirley W. Packard, Cleveland, Ohio, assignors to The Parker Appliance Company, Cleveland, Ohio, a corporation of Ohio Application February 18, 1944, Serial No. 522,899

5 Claims. (Cl. 285—86)

The invention relates generally to hose couplings and primarily seeks to provide a novel form of hose coupling particularly adapted for secure attachment on a flexible, high pressure hose and comprising a nipple and socket sleeve assembly providing a thin cylindriform extension insertible in the end of the hose to be clamped and a surrounding annular chamber or socket for receiving the end of the hose, a sleeve contracting nut threadable on the socket sleeve and surrounding the hose, and a contractible clamp sleeve surrounding the hose between the socket sleeve and the contracting nut and adapted to be contracted upon threading home of the contracting nut on the socket sleeve to tightly grip and securely clamp the hose end in the coupling.

An object of the invention is to provide a coupling of the character stated wherein the contractible clamp sleeve comprises a thin ring with a plurality of flexible fingers extending endwise therefrom and each carrying a rigid, hose clamping end portion, the socket sleeve has a counterbore or stepped portion for receiving the thin ring, and the contracting nut has a tapered camming surface portion engageable with the rigid finger end portions during threading home of the nut on the socket sleeve for contracting the fingers and forcing them into tight clamping contact with the exterior of the hose within the coupling.

Another object of the invention is to provide a coupling of the character stated wherein the rigid fingers on the clamp sleeve have gripper teeth on their inner faces, and the outer surfaces of said fingers and the tapered camming surface portion of the nut bear such relation as to engage in line contact during the major part of the progressive threadable assembly of the coupling.

With the above and other objects in view that will hereinafter appear, the nature of the invention will be more clearly understood by reference to the following detailed description, the appended claims, and the several views illustrated in the accompanying drawing.

In the drawing:

Figure 1 is a longitudinal sectional view illustrating a coupling embodying the invention, the completely assembled condition of the coupling being illustrated.

Figure 2 is a fragmentary longitudinal sectional view illustrating the parts of the coupling in an initially assembled condition prior to commencement of the contraction of the contractible clamp sleeve and the clamping of the hose thereby.

Figure 3 is a view similar to Figure 2 illustrating a progressive stage in the assembly of the coupling.

Figure 4 is a detail longitudinal sectional view illustrating the contractible clamp sleeve.

The coupling herein disclosed as an example of embodiment of the invention, includes a nipple member generally designated 5, a socket sleeve member generally designated 6 and which is preferably threaded onto the nipple member but may be formed integrally therewith, a contractible clamp sleeve generally designated 7, and a clamp sleeve contracting nut 8. This coupling may be secured on various forms of hose, but it is preferred that the same be secured on a flexible hose composed in the usual manner of an outer layer 9 and an inner layer 10 of rubber or like yieldable material, and an interposed reinforcing braid 11 such as a steel wire braid.

The nipple member preferably includes a non-circular or nut portion 12 providing an abutment shoulder, an externally threaded extension 13, and a long thin cylindriform end extension 14. The nipple member also is provided with an axial bore 15 which is of substantially the same diameter as the internal diameter of the hose, as will be apparent by reference to Figure 1. It will also be apparent by reference to Figures 1 to 3 of the drawing that the nipple extension 14 is of less outer diameter than the extension 13.

The socket sleeve member is constructed to include a non-circular or nut portion 16 and is internally threaded as at 17 so that it may be threaded onto the externally threaded extension 13 of the nipple member. The socket sleeve also includes an externally threaded cylindrical extension 18 which is counterbored as at 19 to co-operate with the cylindriform end extension 14 of the nipple member in providing an annular hose end receiving chamber terminating inwardly in a hose end abutment wall 20. The socket sleeve extension 18 also is provided with a shallow counterbore 21 for receiving the end of the clamp sleeve generally designated 7 in the manner clearly illustrated in Figure 2.

The contractible clamp sleeve is constructed in the manner clearly illustrated in Figure 4 of the drawing and includes a thin, continuous ring portion 22 having a plurality of flexible, longitudinally extended fingers 23 projecting therefrom, each of said fingers including a heavy non-yieldable end portion 24 terminating in a tapered end shoulder 25 and having hose gripping teeth or threads 26 formed on the inner surface thereof. Each thin finger portion 23 may be apertured as at 27 so as to reduce the resistance thereof to free bending.

The clamp sleeve contracting nut is constructed to include a non-circular or nut portion 28, an internally threaded cylindrical portion 29 threadable onto the externally threaded cylindrical extension 18 of the socket sleeve member, and a tapered end portion 30 providing an internally tapered camming surface 31.

In the assembly of the coupling, the long thin cylindriform nipple end extension 14 is inserted in the end of the hose in the manner illustrated in Figure 2 so as to place the end of the hose against the abutment wall 20 in the receiving chamber between the nipple and socket sleeve members generally designated 5 and 6. It will be observed by reference to Figure 2 of the drawing that in this condition of the parts the contractible clamp sleeve 22 is disposed in the shallow counterbore 21 and freely surrounds the hose in its normal, generally cylindriform condition.

As the clamp sleeve contracting nut is threaded onto the extension 18 of the socket sleeve member, the large diameter extremity of the internally tapered camming surface 31 will first contact the tapered end shoulders 25 of the sleeve fingers 24 and commence the inward bending or contraction of the sleeve generally designated 7. The external surfaces of the heavy non-yielding sleeve finger portions 24 and the internally tapered camming surface 31 bear such relation that during the major portion of the progressive assembly of the coupling, or the threading home of the clamp sleeve contracting nut 8 on the socket sleeve extension 18, said camming surface 31 engages the inwardly bending fingers, or rather the heavy non-yielding end portions thereof in line contact, as at 32. It is not until the assembly of the coupling is substantially completed that the internally tapered camming surface 31 engages in parallel contact with the external surfaces of the heavy non-yielding end portions 24 of the clamp sleeve fingers in the manner illustrated in Figure 1. The inward bending or contraction of the clamp sleeve fingers causes the teeth 26 on said fingers to become embedded in and tightly grip the external surface of the hose in the manner clearly illustrated in Figure 1.

The above-mentioned feature of causing the internally tapered camming surface 31 to engage in line contact with the inwardly bending gripper fingers of the clamp sleeve throughout the major portion of the progressive assembly of the coupling is very important since by this means maximum leverage application against the clamp fingers is provided, and this makes it easier to contract the fingers. Also, the contracting pressure is applied opposite the portion of the hose which is going to be subjected to the maximum grip. The stiffness of the finger portions 24 makes this feature possible, for if the fingers in themselves were yieldable, rather than only the inner end portions 23 thereof, the line contact would quickly change to surface contact, resulting in the provision of a shorter lever arm accentuating the fingers in a manner for bending them inwardly. As before stated, in this coupling structure, overall surface contact between the camming surface 31 and the external faces of the heavy non-yielding fingers 24 occurs only at the very end of the clamping operation when the fingers are embedded in the hose to such an extent that their outer surfaces parallel the camming surface 31.

It will be obvious also that by reason of the provision of the line contact throughout the major portion of the progressive assembly of the coupling, rotation of the contracting nut 8 incident to the progressing of the assembly is greatly facilitated.

Another feature in the herein disclosed coupling resides in the fact that the improved clamp sleeve member illustrated in Figure 4 provides finger sections which can be readily straightened by hand when it is desired to disassemble the coupling and remove the hose. The assembly can be used over and over again without replacing any of the metal parts. It will be apparent also that the weakest portions 23 of the clamp fingers are supported in the shallow counterbore 21 against radial expansion. It is also an advantage in disposing the heavy non-yielding clamp finger portions 24 free from engagement in the chamber of the socket sleeve member 6, for by this means no increased resistance to contraction of the fingers such as is provided in some prior art coupling structures is provided in the present structure.

While one form of the invention has been shown for purposes of illustration, it is to be clearly understood that various changes in the details of construction and arrangement of parts may be made without departing from the spirit and scope of the invention as defined in the appended claims.

We claim:

1. In a hose coupling of the character described, a nipple formed to provide a thin cylindriform extension insertible in the end of a hose to be clamped and a socket sleeve threaded on the nipple to provide a stepped annular chamber for receiving said hose end, a clamp sleeve contracting nut threadable on the socket sleeve and having a tapered camming surface surrounding the hose and the cylindriform extension inserted therein, and a contractible clamp sleeve surrounding the hose within the stepped portion of the socket sleeve and the nut and having one end abutting and held against endwise movement by the socket sleeve and its other end presented for engagement by the camming surface of the nut for being contracted against the external surface of the hose as the nut is threaded home on the socket sleeve.

2. A coupling structure as defined in claim 1 in which the contractible clamp sleeve comprises a thin ring with a plurality of fingers flexibly attached to and extending endwise therefrom and each terminating in a rigid hose clamping end portion.

3. A coupling structure as defined in claim 1 in which the contractible clamp sleeve comprises a thin ring with a plurality of fingers flexibly attached to and extending endwise therefrom and each carrying a rigid hose clamping end portion so cooperatively related to the contracting nut camming surface as to engage the same in extended line contact during the major portion of the threading home of the contracting nut on the socket sleeve incident to the assembly of the coupling and the clamping of the hose therein.

4. A coupling structure as defined in claim 1 in which the contractible clamp sleeve comprises a thin ring with a plurality of flexible fingers extending endwise therefrom and each carrying a rigid hose clamping end portion, and said stepped portion of the socket sleeve receiving the thin ring and the bases of the flexible fingers of the contractible clamp sleeve and providing a support wall supporting said finger bases against outward bending during the threading together of the contracting nut and the socket sleeve.

5. A coupling structure as defined in claim 1 in which the contractible clamp sleeve comprises a thin ring with a plurality of flexible fingers extending endwise therefrom and each carrying a rigid hose clamping end portion, and said socket sleeve has a counter bore for receiving the thin ring and the bases of the flexible fingers of the contractible clamp sleeve and providing a support wall supporting said flexible fingers against outward bending during the threading together of the contracting nut and the socket sleeve, said flexible fingers being apertured opposite said support wall to reduce their resistance to inward bending.

JOHN N. WOLFRAM.
SHIRLEY W. PACKARD.

REFERENCES CITED

The following references are of record in the file of this patent:

UNITED STATES PATENTS

| Number | Name | Date |
|---|---|---|
| 2,152,975 | Sanford | Apr. 4, 1939 |
| 2,328,298 | Santhoff | Aug. 31, 1943 |

FOREIGN PATENTS

| Number | Country | Date |
|---|---|---|
| 3,454 | Great Britain | 1895 |
| 431,918 | Great Britain | July 17, 1935 |
| 306,761 | Great Britain | Feb. 28, 1929 |